Sept. 8, 1964     A. S. WOODWARD     3,148,010
TEST JACK FOR PRINTED CIRCUIT BOARDS
Filed April 20, 1962
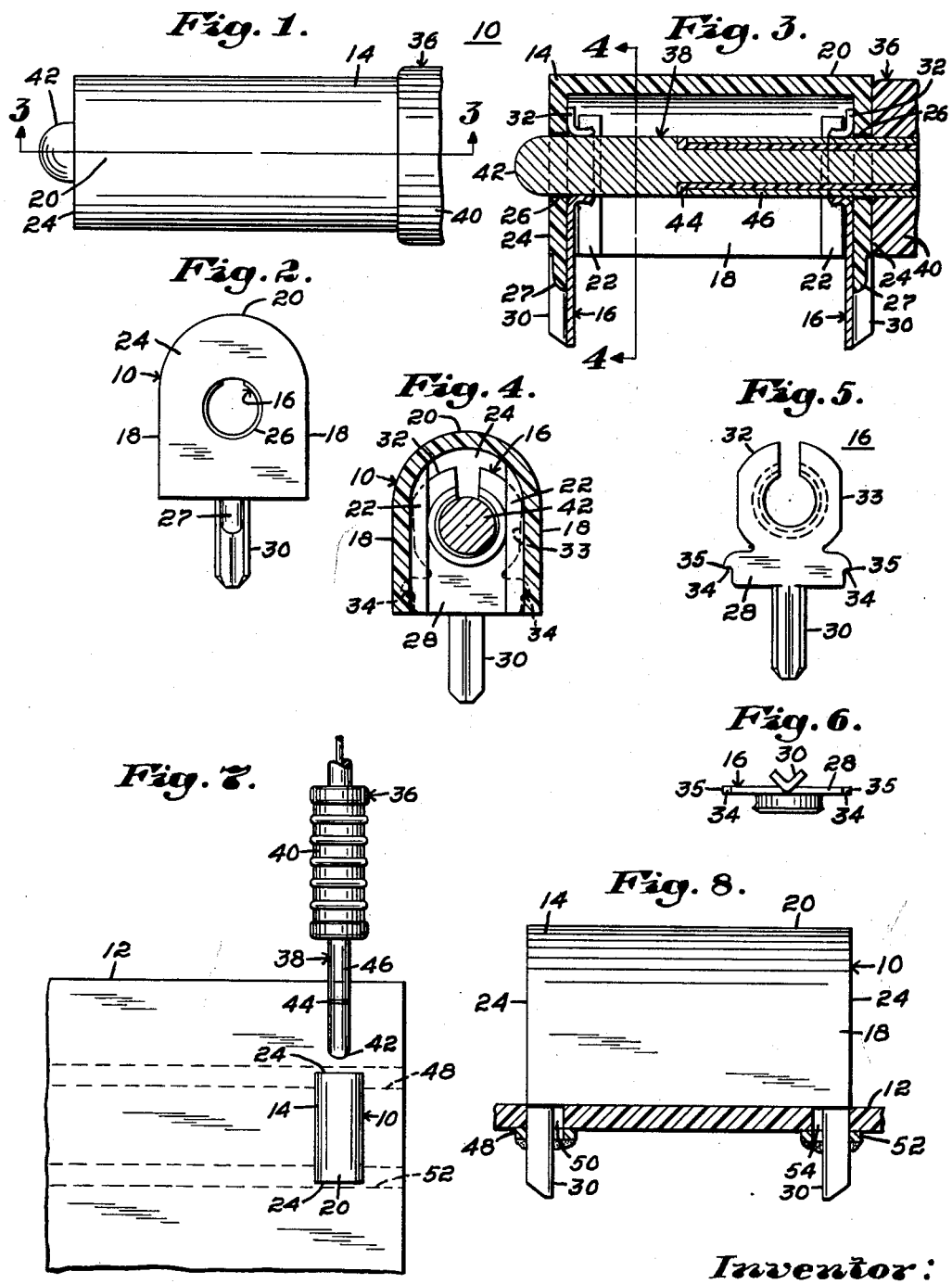

3,148,010
TEST JACK FOR PRINTED CIRCUIT BOARDS
Arthur Stanley Woodward, Natick, Mass., assignor to United-Carr Incorporated, a corporation of Delaware
Filed Apr. 20, 1962, Ser. No. 189,147
1 Claim. (Cl. 339—183)

This invention pertains generally to test jacks and particularly to a test jack for use in determining voltage or current in a circuit.

An object of the invention is to provide a test jack which will allow evaluation of two bits of information from a single observation point.

A second object of the invention is to provide a test jack for testing potential differences between two conductors, the test jack capable of accepting a probe from either of two sides.

A still further object of the invention is to provide a test jack having means for preventing solder migration.

Other objects of the invention will, in part, be obvious, and will, in part, appear hereinafter.

In the drawings—

FIG. 1 is a top plan view of the test jack;
FIG. 2 is an end view of the test jack shown in FIG. 1;
FIG. 3 is a section taken on line 3—3 of FIG. 1;
FIG. 4 is a section taken on line 4—4 of FIG. 3;
FIG. 5 is a front elevation of the contact as part of the test jack shown in FIG. 1;
FIG. 6 is a bottom plan view of the contact shown in FIG. 5;
FIG. 7 is a top plan view of the test jack shown in FIG. 1 mounted on a printed circuit board and also showing a top plan view of the bifurcated probe; and
FIG. 8 is an enlarged side elevation, partly in section, of the test jack shown in FIG. 1 applied to a printed circuit board.

The illustrated and described test jack allows the operator to obtain from a single observation point evaluation of two bits of information for determination of a difference of potential between two conductive paths. It would also be possible to take a current reading utilizing an option requiring that the current path be broken and an ammeter be placed into the circuit. It would also require that the test jack utilize a probe, not shown, or the like, to complete the circuit when an ammeter reading is not being taken.

Referring to the drawings, there is illustrated a test jack assembly 10 adapted for insertion into apertures formed in a printed circuit board 12. The test jack assembly 10 comprises a housing 14 formed of a dielectric material preferably of a plastic, and a pair of contact members 16.

The housing 14 has a cross-sectional configuration similar to a round arch, and includes a pair of side walls 18 in spaced parallel relation to each other joined at a terminal edge by an arc portion 20, integral with the side walls 18 and spaced from the open under body of the housing 14, and a pair of support barriers 22 formed on the side walls 18. The support barriers 22 are in spaced parallel relationship to each other and to an end wall 24 which substantially closes off each end of the test jack assembly 10 formed by the side walls 18 and the arc portion 20. An aperture 26 is formed through the end wall 24 for a purpose to be described hereinafter. The space between each of the support barriers 22 and the end wall 24 forms a channel which is utilized to assist in the engagement of the housing with the contact member 16.

A tab member 27 extends from the bottom part of the end wall 24 away from the arc portion 20. The use of this tab member will be described hereinafter.

The contact member 16 is formed from a resilient conducting material and is of a one-piece construction. The contact member 16 comprises a base portion 28, a shank member 30 extending from said base portion 28 having a V configuration and being chamfered at its free terminal end, for a purpose to be described hereinafter. Extending from the opposite side of the base portion 28 is a circular jack-engaging member 32. A slot is formed through the jack-engaging member 32 approximately on an axis drawn through the contact member 16 as shown at FIG. 4. This slot forms the jack-engaging member 32 into two arcuate arms capable of some flexure to take up any differences which may occur within the inside surface of the housing 14 and to assist in holding contact member 16 in engagement with the housing. A pair of shoulders 34 extends on each side of the base portion 28 at right angles to the axis of the contact member 16. The shoulders 34 extend on both sides beyond the peripheral circumference of the jack-engaging member 32, and to assist in this it is possible to remove a section of the arc of the jack-engaging member 32 as shown in FIG. 5 to create a flat portion 33. The shoulders 34 are formed in a configuration which creates free terminal ends 35 shaped to allow them to dig into the sides of the housing 14 on engagement.

To place the contact members into engagement with the housing 14, the jack-engaging member 32 is slid into the housing between the support barrier 22 and an end wall 24, until the upper portion of the jack-engaging member 32 almost abuts the inner surface of the arc portion 20 of the housing 14. The distance between the ends of the shoulders 34 is slightly greater than the distance between the inner surfaces of the side walls 18 and therefore, as stated heretofore, the shoulders 34 will provide a digging engagement with the side walls 18. The shoulders 34 form a fairly sharp right angle with the base portion 28 to prevent the contact member 16 from being pulled from engagement with the housing 14 once it has been placed in position. The tab member 27 is positioned in such a way in relation to the housing that it slides into the V-shaped channel formed by the shank member 30. This will greatly assist in keeping solder from migrating into the base portion of the contact member when the jack is soldered to a printed circuit board.

If the inner wall of the side walls 18 are irregular in surface, the ability of the two arcs of the jack-engaging member 32 to flex, which flexure is allowed by the slot formed therein, will act as a takeup and will allow the jack-engaging member 32 to engage the inner surface of the housing if such engagement is required.

The probe 36 comprises a shank element 38 and an insulating element 40. The shank element is circumscribed by a portion of the insulated element 40 as shown in FIG. 3. The shank element 38 consists of three distinct portions, a primary probe portion 42 which consists of a head element and integral tail element extending from said head element and having a width substantially less than the head element to form a shoulder with the head element. An insulating sleeve which extends at one of its ends a shoulder portion to the outer periphery of the shoulder formed by the head element and the tail element and which completely circumscribes the major portion of the tail element, and finally, a secondary probe portion 46 which is butted against the insulating sleeve 44 at its shoulder and which circumscribes in abutting relationship the remaining portion of the insulating sleeve 44, thereby leaving an insulating gap between the head element of the primary probe portion 42 and the secondary probe portion 46.

To utilize the device in determining the voltage between two circuits in a printed circuit construction, the test jack assembly is first engaged in a permanent manner to the printed board 12. This engagement is accomplished by forming an extruded hole through the first printed circuit 48 which is placed onto the printed board 12. There are several methods of placing the circuitry into engagement with the board, all of which are well-known in the printed circuit art. An aperture 50 is then formed through the first printed circuit 48 and the printed board 12 with a portion of the circuit 48 preferably extruded down adjacent the hole forming the aperture 50. A second printed circuit 52 is formed in the same manner as the first printed circuit 48 with an aperture 54 formed in a similar manner to the aperture 50. The two apertures 50 and 54 lie on a straight line and of course are spaced from each other the approximate distance between the shank members 30—30.

The test jack assembly 10 is engaged to the printed circuit board 12 by passing the shank members 30 through the apertures 50 and 54 and the circuit elements 48 and 52 in a manner which has the test jack assembly 10 bridging the gap between the two printed circuits 48 and 52. When the test jack assembly 10 is completely seated on the printed board 12, the free ends of the side walls 18 of the housing 14 are in superposed abutting relationship to the printed board 12. Solder is then applied to the jointure of the walls of the apertures 50 and 54 and the shank members 30. It is at this time that the tab members 27 function to prevent solder from migrating up into the base portion 28 of each of the contact members 16. The probe 36 may now be used to test the potential difference between the two circuits 48 and 52, and this is accomplished in the following manner. The probe is inserted into one of the apertures 26 of a contact member 16 and the insertion is continued until the head element of the probe 36 engages in abutting relationship the opposing contact member on the other side of the housing. This creates a situation whereby the primary probe portion 42 engages one of the contact members 16 and the other contact 16 engages the secondary probe portion 46, the two probe portions being separated by the insulating sleeve 44. A reading may now be taken of the potential difference between the two circuits 48 and 52.

Since certain other obvious modifications may be made in this device without departing from the scope of the invention, it is intended that all matters contained herein be interpreted in an illustrative and not in a limiting sense.

I claim:

An electrical assembly for use on printed circuit boards comprising an insulating housing and a pair of unitary contact members, said housing comprising a hollow shell having apertured end walls and laterally spaced, traversely yieldable side walls, said side walls having a first pair of support barriers formed a predetermined distance from one end wall and a second pair of support barriers formed a predetermined distance from the other end wall, said contact members being in spaced relation to each other and in engagement with said side walls between said support barriers and said end walls, and each of said contact members having a wall defining an aperture therethrough and a vertical slot formed therein extending from said aperture through said contact member to form a pair of flexible arms and a shank extending from each of said contacts as a continuation of the wall defining said aperture.

References Cited in the file of this patent

UNITED STATES PATENTS

| | | |
|---|---|---|
| 840,537 | Weir | Jan. 8, 1907 |
| 1,841,468 | Ford | Jan. 19, 1932 |
| 1,996,459 | Clinton | Apr. 2, 1935 |
| 2,911,614 | Davis | Nov. 3, 1959 |
| 2,958,065 | Flanagan | Oct. 25, 1960 |
| 3,005,180 | Dreher | Oct. 17, 1961 |
| 3,020,520 | Berg | Feb. 17, 1962 |